United States Patent [19]
Nakamura et al.

[11] 4,439,714
[45] Mar. 27, 1984

[54] DEFLECTION CONTROL CIRCUIT

[75] Inventors: Takashi Nakamura, Hadano; Yoshihiro Morioka, Atsugi, both of Japan

[73] Assignee: Sony Corporation, Tokyo, Japan

[21] Appl. No.: 283,358

[22] Filed: Jul. 14, 1981

[30] Foreign Application Priority Data

Jul. 14, 1980 [JP] Japan .................... 55-95892

[51] Int. Cl.$^3$ ............................................. H01J 29/56
[52] U.S. Cl. ...................................... 315/371; 358/217
[58] Field of Search ............... 315/370, 371, 395, 398; 358/217, 50, 51

[56] References Cited

U.S. PATENT DOCUMENTS 3,872,499 3/1975 McConnell et al. .................. 358/51
3,925,812 12/1975 Blom et al. ............................ 358/51
4,051,512 9/1977 van Roosmalen et al. ........... 358/51

Primary Examiner—Theodore M. Blum

Attorney, Agent, or Firm—Lewis H. Eslinger; Alvin Sinderbrand

[57] ABSTRACT

A deflection control circuit is provided for a plural-tube color television camera for compensating the deflection sawtooth waves furnished to the red and blue image pickup tubes so that the images thereof register with the image of the green pickup tube, and any centering, skew, rotation, or other errors are eliminated. The circuit includes a pair of controllable complementary current sources, such as junction transistors, with current outputs connected together in series, and with each current source having a control terminal. An impedance is connected to the junction of the current outputs, and a sawtooth wave, furnished directly to the green pickup tube, is also supplied therethrough. A control signal generator supplies a correction voltage to the control terminals of the current sources so that the current through the latter is varied in a complementary relation. A compensated output sawtooth wave is provided from the junction of the current sources to one of the red and blue pickup tubes.

9 Claims, 3 Drawing Figures

DEFLECTION CONTROL CIRCUIT

BACKGROUND OF THE INVENTION

1. Field of the Invention

This invention relates to television cameras, and is more particularly directed to plural-tube type color television cameras having image-pickup tubes of the electrostatic deflection type. More specifically, this invention concerns deflection control circuitry in which deflection signals applied to the deflection circuit of an image pick-up tube are adjusted to compensate for centering, size, skew, rotation, and the like.

2. Description of the Prior Art

Conventional television cameras utilize image pick-up tubes in which electron beams are scanned in the horizontal and vertical directions in a raster pattern on a photo-conductive target on which an optical image is incident. In a plural pick-up tube color television camera, the image is split into separate red, green, and blue portions, and provisions must be incorporated in the color television camera to ensure registration of the three images. For example, centering adjustment, size adjustment, skew adjustment, and rotation adjustment are usually necessary. In the centering adjustment, the center of the effective scan area is moved. In the size adjustment, the size of the effective scan area is changed. In the skew and the rotation adjustment, the effective scan area is rotated.

If the image pick-up tube is of the magnetic deflection type, the positions of the deflection coils can be mechanically adjusted to correct for centering, size, rotation, or skew. However, in an image pick-up tube of the electrostatic deflection type, electrical adjustment voltages must be added to the sawtooth horizontal and vertical deflection voltages in order to effect the various adjustments.

In a three-tube type color television camera with image pick-up tubes of the electrostatic deflection type, deflection voltages are provided from common horizontal and vertical deflection circuits to the horizontal and vertical deflection plates of the respective three image pick-up tubes. Unfortunately, the horizontal and vertical deflection plates of the three image pick-up tubes are not completely identical, and can vary slightly from one another in mechanical characteristics, such as mounting position and size. Accordingly, if the adjusting voltage is merely added to the deflection voltage in the adjusting operation, the deflection relationships of the electron beam in the various image pick-up tubes will not coincide exactly. Therefore, because of the mechanical nonuniformities in the horizontal and vertical deflection plates, the three color images will not be in exact registration. Accordingly, color misregistration and color shift will be apparent in any reproduced image provided from the pick-up television picture.

OBJECTS AND SUMMARY OF THE INVENTION

It is an object of this invention to provide a deflection control circuit for use with a television camera having a plurality of image pick-up tubes to ensure that the deflection relationships of the respective electron beams coincide with one another.

It is another object of this invention to provide a deflection control circuit for use with a plural-tube color television camera, in which color shifting can be eliminated.

In accordance with an aspect of this invention, a deflection control circuit is provided for controlling the deflection of an electron beam in a second (i.e., red or blue) image pick-up tube of a television camera having plural image pick-up tubes, each tube having respective beam deflection circuitry, such as electrostatic deflection electrodes, associated therewith. The deflection control circuit comprises a sawtooth signal source generating a sawtooth signal to be supplied to the beam deflection circuit of a first (i.e., green) image pick-up tube of the plural tubes, whose signal serves as a reference for correction of the scanning of the second tubes. The deflection control circuit also includes a pair of controllable current sources of complementary types, for example, junction transistors, with output electrodes thereof connected in series together to define a junction therebetween, each such current source having a control terminal, an impedance coupling the sawtooth signal source to the junction, and a control signal generator coupled to the pair of current sources to provide a control signal to the control terminals thereof, and thereby to control the flow of current through the respective controllable current sources to vary in a complementary fashion. A compensated output sawtooth scanning signal is then provided from the junction to beam deflection circuit associated with the second image pick-up tube. Preferably, if the image pick-up tubes are of the electrostatic deflection type, the sawtooth scanning signal is composed of a pair of complementary, oppositely polarized sawtooth waves applied to respective plates of a pair of deflection plates. In that case, a second pair of controllable current sources is provided connected in a fashion similar to the first pair of controllable current sources, and another impedance coupling the control signal generator to the junction of the second pair of controllable current sources, so that the pair of complementary oppositely polarized sawtooth waves are applied respectively through the first-mentioned and the second impedances. An inverter is coupled between the control signal generator and the control terminals of the second controllable current sources. In this arrangement, complementary compensated sawtooth scanning signals of opposite polarity are provided from the junctions of the first-mentioned and of the second controllable current sources.

Also preferably, an adjustable centering circuit can be provided for adjusting the DC balance between the first-mentioned and the second pairs of controllable current sources.

These and other objects, features, and advantages of this invention will become apparent from the ensuing description, when considered with the accompanying drawings.

DETAILED DESCRIPTION OF THE PREFERRED EMBODIMENTS

Figure 1:
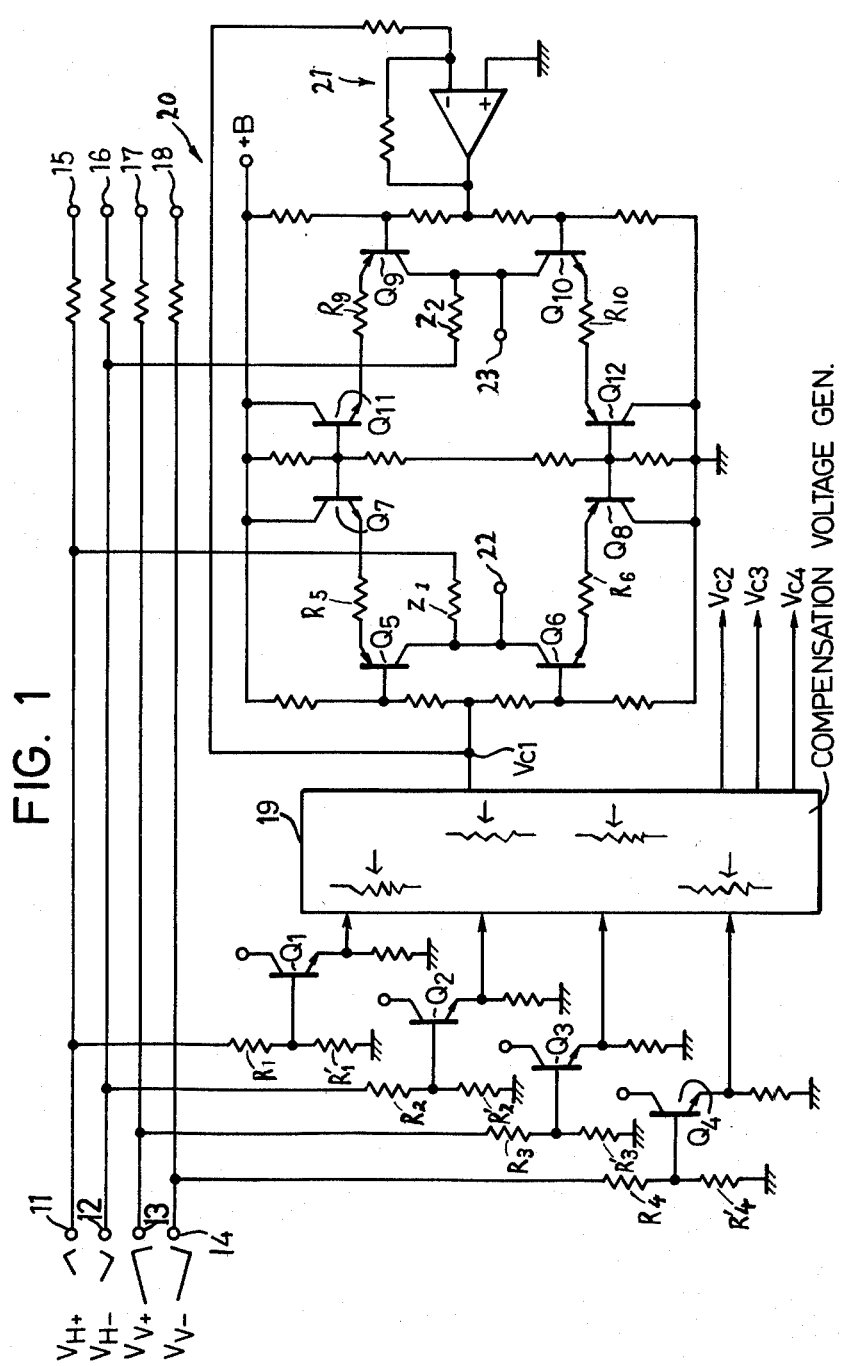
FIG. 1 is a circuit diagram of a deflection control circuit according to a first embodiment of this invention.

With reference to the drawings, initially to FIG. 1 thereof, a deflection control circuit is shown for use with a color television camera having red, green, and blue image pick-up tubes, and for compensating deflection sawtooth waves furnished to the red and blue image pick-up tubes so that the images thereof are in registration with the image of the green pick-up tube. In this embodiment, the pick-up tubes are of the electrostatic deflection type, and each have a pair of vertical deflection plates and a pair of horizontal deflection plates disposed orthogonally thereto. Horizontal and vertical deflection voltages are applied respectively to the horizontal and vertical deflection plates of the three pick-up tubes, and such deflection voltages are provided from the output of a common deflection voltage generator. As is usual, the green pick-up tube, which provides a green (G) signal is used as the reference tube, since, in usual lighting conditions, the G-signal includes more video information than do the blue (B) signal and the red (R) signal from the blue and red pick-up tubes, respectively. The output of the common deflection voltage generator is applied directly to the deflection plates of the green pick-up tube from which the G-signal is obtained. However, before being applied to the other pick-up tubes, this output must be compensated, to account for physical nonuniformities of the deflection plate of the remaining two pick-up tubes, and the compensated deflection voltages are then applied to the respective deflection plates of the blue and red pick-up tubes so that the B-signal and the R-signal will be in registration with G-signal. More particularly, as shown in FIG. 1, input terminals 11 and 12 are provided to receive the complementary, oppositely-polarized horizontal deflecting voltages $V_{H+}$, $V_{H-}$ from a horizontal deflection voltage generator (not shown) and inputs 13 and 14 receive complementary, oppositely-polarized vertical deflecting voltage $V_{V+}$, $V_{V-}$ from a vertical voltage generator (not shown). These input terminals 11, 12, 13, and 14 are coupled to output terminals 15, 16, 17, and 18, respectively.

Figure 2:
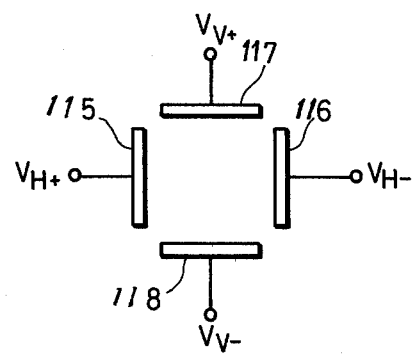
FIG. 2 is a view showing horizontal and vertical electrostatic deflection plates in an image pick-up tube.

As shown in FIG. 2, the green pick-up tube is provided with a pair of horizontal deflection plates 115 and 116, and is also provided with a pair of vertical deflection plates 117, 118. The red and blue image pick-up tubes are similarly provided with horizontal and vertical deflection plates. In this case, the output terminals 15, 16, 17, and 18 are coupled to the plates 115, 116, 117, and 118, respectively, of the green image pick-up tube to provide thereto the uncompensated vertical deflecting voltages $V_{V+}$, $V_{V-}$ and horizontal deflecting voltages $V_{H+}$ and $V_{H-}$.

The inputs 11, 12, 13, and 14 are respectively coupled to one end of a pair of series resistors $R_1$ and $R_1'$, $R_2$ and $R_2'$, $R_3$ and $R_3'$, and $R_4$ and $R_4'$. The dividing points of each of the foregoing pairs of resistors $R_1$, $R_1'$, $R_2 R_2'$, $R_3$, $R_3'$ and $R_4$, $R_4'$ are coupled to respective emitter follower transistors $Q_1$, $Q_2$, $Q_3$, $Q_4$, whose outputs are coupled to inputs of a compensation voltage generator 19.

The compensation voltage generator 19 is formed of elements, not shown here in detail, which have preset values determined in accordance with the aforesaid mechanical differences in the deflection plates 115, 116, 117, and 118 of the various pick-up tubes.

The compensation voltage generator 19 provides respective compensation voltages $V_{C1}$, $V_{C2}$, $V_{C3}$, and $V_{C4}$ to compensate for any misregistration in the horizontal and vertical directions in the R-signal and B-signal.

The compensation voltage $V_{C1}$ is applied to an R-channel horizontal compensation circuit 20 which, in turn, provides compensated horizontal deflection sawtooth waves to the deflection plates 115, 116 of the red pick-up tube. Although not shown, an R-channel vertical compensation circuit, and B-channel horizontal and vertical compensation circuits are also provided. It is understood that such circuits would have construction similar to that of the R-channel horizontal compensation circuit 20.

In the compensation circuit 20, a first pair of complementary transistors $Q_5$ and $Q_6$ are arranged as controllable current sources coupled in series with their collectors connected together to form a junction. The emitter of the transistor $Q_5$ is coupled through a emitter resistor $R_5$ to the emitter of a transistor $Q_7$ whose collector is connected to a supply voltage $+B$, so that the transistor $Q_7$ acts as a constant voltage source. Similarly, the emitter of the transistor $Q_6$ is connected through an emitter resistor $R_6$ to the emitter of a transistor $Q_8$ which is also arranged as a constant voltage source.

A second pair of complementary transistors $Q_9$ and $Q_{10}$ are arranged in a similar fashion to the transistors $Q_5$ and $Q_6$, with their collectors connected together to form a junction, and with their emitters respectively connected through emitter resistors $R_9$ and $R_{10}$ to the emitters of constant voltage source arranged transistors $Q_{11}$ and $Q_{12}$.

The control voltage $V_{C1}$ is applied from the compensation voltage generator 19 to the bases of the transistors $Q_5$ and $Q_6$. The compensation voltage $V_{C1}$ is also applied through an inverter 21 to the bases of the transistors $Q_9$, $Q_{10}$. A first impedance $Z_1$ (preferably a resistance) is coupled between the input 11 and the junction of the collectors of the transistors $Q_5$ and $Q_6$, while a similar impedance $Z_2$ is coupled between the input 12 and the junction of the collectors of the transistors $Q_9$ and $Q_{10}$. Thus, the compensation voltage is applied directly to the bases of the transistors $Q_5$ and $Q_6$ while the horizontal deflection voltage $V_{H+}$ is applied through the impedance $Z_1$ to the collectors of those transistors. Similarly, the compensation voltage $V_{C1}$ is inverted and applied to the bases of the transistors $Q_9$ and $Q_{10}$, while the complementary horizontal deflection voltage $V_{H-}$ is applied through the impedance $Z_2$ to the collectors thereof. Consequently, output terminals 22 and 23 respectively coupled to the junctions of the collectors of the transistors $Q_5$ and $Q_6$ and of the transistors $Q_9$ and $Q_{10}$, provide complementary compensated horizontal deflection voltages.

In the R-channel horizontal compensation circuit 20, the transistors $Q_5$ and $Q_6$ normally operate in a constant-current fashion while the transistors $Q_9$ and $Q_{10}$ similarly operate in a constant-current fashion. However, when the compensation voltage $V_{C1}$ varies from a quiescent level, the current flowing through the transistor $Q_5$ increases by $\Delta$, while the current flowing through the transistor $Q_6$ decreases by an equal amount $\Delta$. Accordingly, a current difference $2\Delta$ occurs between the currents flowing the transistors $Q_5$ and $Q_6$, and the latter difference current $2\Delta$ then flows through the impedance $Z_1$. Thus, the deflection voltage at the output teminal 22 increases by a voltage corresponding to $2\Delta Z_1$. At the same time, the transistors $Q_9$ and $Q_{10}$ have a current difference of $-2\Delta$ and this current difference flows through the impedance $Z_2$. A complementary compensating deflection voltage $-2\Delta Z_2$ is provided at the output terminal 23.

When the direction of the compensation voltage $V_{C1}$ is reversed, the senses of the above currents $2\Delta$ and $-2\Delta$ are also reversed.

The compensation voltages $V_{C2}$, $V_{C3}$, and $V_{C4}$ from the compensation voltage generator 19 are similarly applied to the R-channel vertical compensation circuit, the B-channel compensation circuit, and the B-channel vertical compensation circuit (not shown). The compensation voltages $V_{C2}$, $V_{C3}$, and $V_{C4}$ cause the respective compensation circuits to provide compensated horizontal and vertical deflection sawtooth waves at respective output terminals thereof.

As the compensation voltage generator 19 provides the deflection voltages $V_{C1}$ to $V_{C4}$ to compensate the deflection voltages $V_{H+}$, $V_{H-}$, $V_{V+}$, $V_{V-}$ to adjust the same for the various electrical and mechanical differences in the deflection plates of the respective image pick-up tubes, accordingly, the compensation voltages $V_{C1}$ to $V_{C4}$ cause the R-channel horizontal compensation circuit 20, as well as the remaining (not shown) compensation circuits, to provide compensated deflection voltages which account for centering adjustment, size adjustment, skew adjustment, rotation adjustment, and the like.

Figure 3:
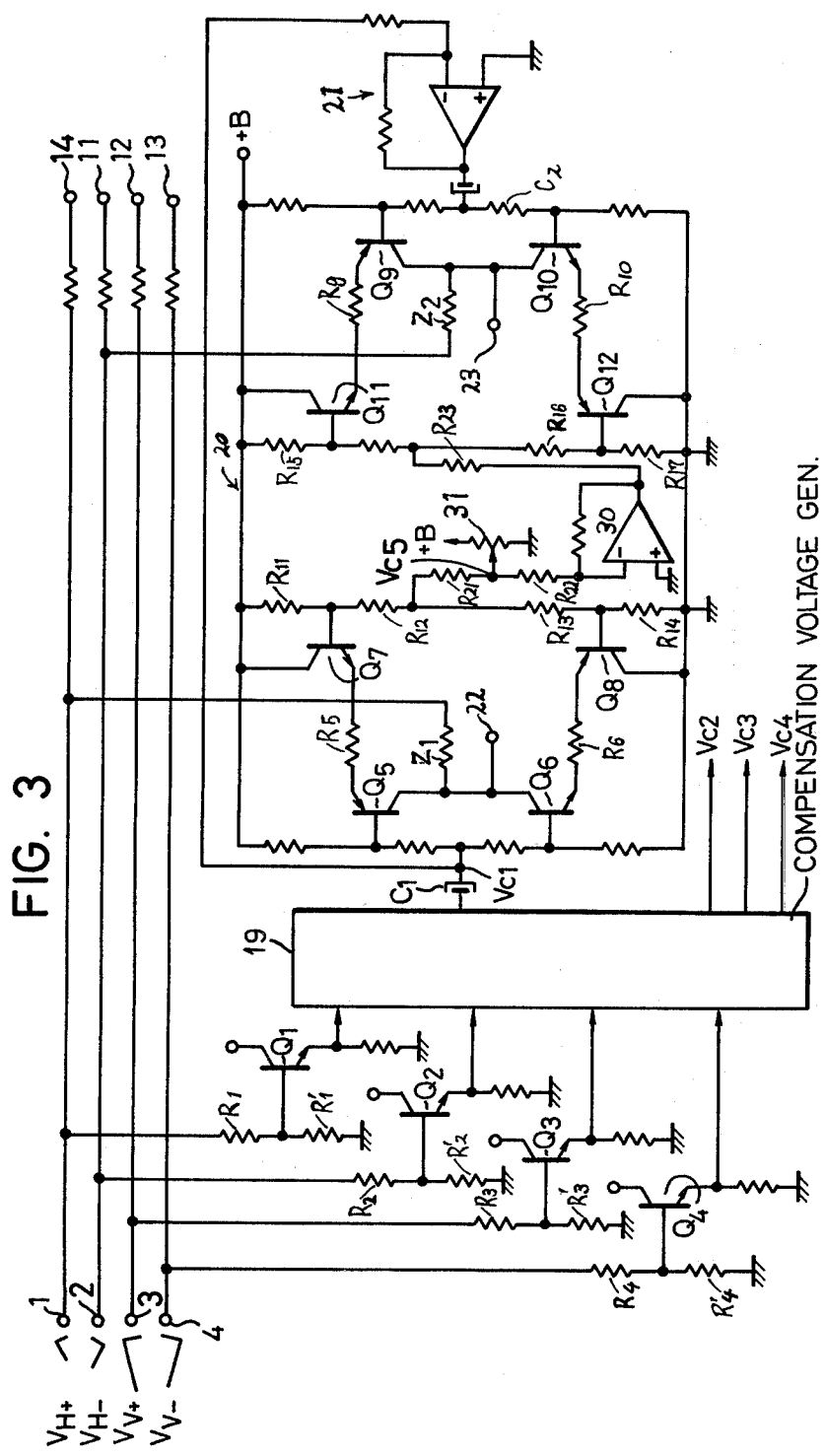
FIG. 3 is a circuit diagram of the deflection control circuit according to a second embodiment of this invention.

FIG. 3 shows a second embodiment of this invention, in which similar elements are identified with the same reference characters, and for which a detailed description is omitted. In this embodiment, a centering adjustment is effected by means of a separate compensation circuit contained within the R-channel horizontal compensation circuit 20.

As shown in FIG. 3, a series arrangement of biasing resistors $R_{11}$, $R_{12}$, $R_{13}$, and $R_{14}$ provides constant voltage bias to the bases of the transistors $Q_7$ and $Q_8$, while a series arrangement of biasing resistors $R_{15}$, $R_{16}$, and $R_{17}$ provides constant voltage biasing to the bases of the transistors $Q_{11}$ and $Q_{12}$. A centering compensation circuit is then provided between the junction of the resistors $R_{12}$ and $R_{13}$ and the junction of the resistors $R_{15}$ and $R_{16}$. In this embodiment, the centering compensation circuit includes an inverter 30, a series arrangement of resistors $R_{21}$ and $R_{22}$ coupled between the junction of resistors $R_{12}$ and $R_{13}$ and an input terminal of the inverter 30, and an output resistor $R_{23}$ coupled between the output of the inverter 30 and the junction of the resistors $R_{15}$ and $R_{16}$. A variable resistance 31 is provided with its resistive element bridging between the voltage source $+B$ and ground, and with its slider connected to the junction of the resistors $R_{21}$ and $R_{22}$.

The source voltage $+B$ is divided in the variable resistor 31 and the divided voltage is applied as a horizontal centering compensation voltage $V_{C5}$ to the junction of the resistors $R_{12}$ and $R_{13}$. This centering compensation voltage $V_{C5}$ is also inverted and applied to the junction of the resistors $R_{15}$ and $R_{16}$. Thus, the bias voltages of the transistors $Q_7$, $Q_8$, $Q_{11}$, and $Q_{12}$ is adjusted in accordance with the setting of the slider of the variable resistor 31, and, consequently, the levels of the compensated deflection voltages $V_{H+}$ and $V_{H-}$ supplied from the outputs 22 and 23 will be adjusted in accordance with the setting of the slider of the variable resistor 31.

It should be apparent that because the centering compensation voltage $V_{C5}$ is a DC voltage, it will operate on the conpensation circuit 20 independently of the compensation voltage $V_{C1}$. Therefore, in this embodiment, the compensation voltage $V_{C1}$ is operative to compensate size, skew, and rotation, and accordingly contains only AC elements. Consequently, DC blocking capacitors $C_1$ and $C_2$ are provided in advance of the bases of the transistors $Q_5$, $Q_6$ and the transistors $Q_9$, $Q_{10}$, respectively to eliminate any DC component from the compensation voltage $V_{C1}$ and also to block any DC feedback into the compensation voltage generator 19.

In the foregoing embodiment, one of the three image pick-up tubes, namely the green pick-up tube, is used as a reference image pick-up tube. Consequently, the deflection voltages $V_{H+}$, $V_{H-}$, $V_{V+}$, $V_{V-}$ are applied directly to the deflection plates of the green pick-up tube, while compensated deflection voltages are provided from the outputs of the compensation circuit 20 and the corresponding, not shown compensation circuits to the horizontal and vertical deflection plates of the red and blue pick-up tubes. Accordingly, when the horizontal and vertical deflection sawtooth signals are adjusted with respect to the G-signal of the green image pick-up tube, the corresponding deflection signals for the red and blue image pick-up tubes will be adjusted similarly, without loss of registration of the R-signal and B-signal. In other words, the deflection relationships of the several image pick-up tubes remain in step with one another.

Furthermore, while the above-described embodiments have been explained with respect to a three-tube type television camera having image pick-up tubes of the electrostatic deflection type, it should be apparent that a deflection control circuit according to this invention could instead be readily constructed for use with a plural tube color television camera having image pick-up tubes of the magnetic deflection type.

While the above illustrative embodiments of this invention have been described in detail herein with reference to the accompanying drawings, it is to be understood that the invention is not limited to those precise embodiments, and that various changes and modifications can be effected therein by one skilled in the art without departing from the scope and spirit of this invention as defined in the appended claims.

What is claimed is:

1. A deflection control circuit for controlling the deflection of an electron beam in an image pickup tube of a television camera having plural image-pickup tubes, each of said tubes having beam deflection means associated therewith, said deflection control circuit being of the type including sawtooth signal source means generating a sawtooth scanning signal to be supplied to the beam deflection means of another image pickup tube of said plural tubes and control signal generating means for producing a control signal in response to said sawtooth scanning signal to compensate for mechanical differences between said beam deflection means of said first-mentioned and other image pick-up tubes, said deflection control circuit comprising:

a pair of controllable current sources of complementary types coupled in series together to define a junction therebetween, each such current source having a control terminal, said pair of controllable current sources coupled to said control signal generating means with said control terminals thereof supplied with said control signal such that the flow of current through the respective controllable current sources is controlled to vary in a complementary relation;

an impedance coupling said sawtooth signal source means to said junction; and output means coupled to said junction for providing a compensated sawtooth scanning signal to the beam deflection means associated with the first-mentioned image pickup tube.

2. A deflection control circuit according to claim 1, wherein said control signal generating means includes circuit network, formed of adjustable circuit elements having parameters thereof present to provide said control signal to compensate for mechanical differences between said first-mentioned pickup tube and said other pickup tube.

3. A deflection control circuit according to claim 1, wherein said deflection means of each said pick-up tube includes a first pair of electrostatic deflection plates and a second pair of electrostatic deflection plates disposed orthogonally thereto, and said sawtooth scanning signal includes a first pair of complementary oppositely polarized sawtooth waves applied to respective ones of said first pair of plates and a second pair of complementary oppositely polarized sawtooth waves applied to respective ones of said second pair of plates.

4. A deflection control circuit according to claim 3, further comprising a second pair of controllable current sources of complementary types coupled in series together to define a junction therebetween, each such current source having a control terminal; an inverter coupling said control signal generating means to the control terminals of said second controllable current sources; a second impedance coupling one wave of one of said first and second complementary pairs to the junction of said second pair of current sources, the first-mentioned impedance coupling the other of said one of said complementary pairs of waves to the first-mentioned junction; and complementary output means coupled to said second junction for providing a complementary compensated sawtooth scanning signal, opposite in polarity to said compensated sawtooth scanning signal, the latter and said complementary compensated sawtooth scanning signal being applied to respective plates of one said pair of plates.

5. A deflection control circuit according to claim 4, further comprising adjustable centering circuit means for adjusting the DC balance between said first-mentioned and said second pairs of controllable current sources.

6. A deflection control circuit for use with a television camera having a plurality of pickup tubes, each having at least one pair of deflection electrodes therein, said deflection control circuit being of the type having control signal generating means for producing first and second complementary control signals for a first one of said pickup tubes in response to a pair of complementary sawtooth scanning signals to compensate for mechanical differences between said deflection electrodes of said first one of said pickup tubes and a second one of said pickup tubes, said deflection control circuit comprising:

sawtooth source means for generating said pair of complementary sawtooth scanning signals to be supplied to the deflection electrodes of said second one of said pickup tubes;

a first pair of controllable current sources, each having a control electrode supplied with said first complementary control signal, and connected in series to define a first junction;

a first impedance coupled to said sawtooth source means and to said first junction to furnish thereto one of said sawtooth scanning signals;

a second pair of controllable current sources, each having a control electrode supplied with said second complementary control signal, and connected in series to define second junction;

a second impedance coupled to said sawtooth source means and to said second junction to furnish thereto the other of said sawtooth scanning signals; and output means deriving complementary compensated sawtooth scanning signals from said junctions and applying the same to the deflection electrodes of said first one of said pickup tubes.

7. A deflection control circuit according to claim 6, wherein said first and second impedances each include a resistor.

8. A deflection control circuit according to claim 6, further comprising first and second constant voltage sources respectively applying voltage to each of said first pair of controllable current sources, third and fourth constant voltage sources respectively applying voltage to each of said second pair of controllable current sources, first biasing means for biasing said first and second constant voltage sources at first and second controlled levels, second biasing means for biasing said third and fourth constant voltage sources at third and fourth controlled levels, and centering adjustment circuit means coupled between said first and second biasing means to provide an adjustable DC offset therebetween, thereby selectively shifting said first and second controlled levels relative to said third and fourth levels.

9. A deflection control circuit according to claim 8, wherein said centering adjustment circuit means includes a variable voltage source having an output coupled to said first biasing means, and an inverter circuit having an output coupled to the output of said variable voltage source and an output coupled to said second biasing means.

* * * * *